United States Patent
Senga et al.

(10) Patent No.: US 10,865,108 B2
(45) Date of Patent: Dec. 15, 2020

(54) COMPLEX COMPRISING SULFUR, A METHOD FOR MANUFACTURING THE SAME, AND A METHOD FOR MANUFACTURING A SOLID ELECTROLYTE

(71) Applicant: IDEMISTU KOSAN CO., LTD., Tokyo (JP)

(72) Inventors: Minoru Senga, Sodegaura (JP); Takashi Umeki, Sodegaura (JP)

(73) Assignee: IDEMITSU KOSAN CO., LTD, Tokyo (JP)

( * ) Notice: Subject to any disclaimer, the term of this patent is extended or adjusted under 35 U.S.C. 154(b) by 61 days.

(21) Appl. No.: 15/839,400

(22) Filed: Dec. 12, 2017

(65) Prior Publication Data

US 2018/0162730 A1 Jun. 14, 2018

(30) Foreign Application Priority Data

Dec. 14, 2016 (JP) ................................. 2016-242370

(51) Int. Cl.
| | |
|---|---|
| *H01M 10/0562* | (2010.01) |
| *C01B 17/22* | (2006.01) |
| *C01B 17/16* | (2006.01) |
| *H01M 4/58* | (2010.01) |
| *C01D 15/04* | (2006.01) |

(52) U.S. Cl.
CPC .............. *C01B 17/22* (2013.01); *C01B 17/16* (2013.01); *C01D 15/04* (2013.01); *H01M 4/5815* (2013.01); *C01P 2002/70* (2013.01); *C01P 2002/72* (2013.01); *H01M 10/0562* (2013.01); *H01M 2300/0068* (2013.01)

(58) Field of Classification Search
CPC combination set(s) only.
See application file for complete search history.

(56) References Cited

U.S. PATENT DOCUMENTS

| | | | |
|---|---|---|---|
| 8,084,160 B2 | 12/2011 | Seino et al. | |
| 9,444,121 B2 * | 9/2016 | Yanagi | .............. H01M 10/0562 |
| 10,252,232 B2 | 4/2019 | Yanagi | |
| 2007/0196739 A1 | 8/2007 | Seino et al. | |
| 2014/0272554 A1 | 9/2014 | Yanagi et al. | |

FOREIGN PATENT DOCUMENTS

| | | |
|---|---|---|
| JP | 2010163356 A | 7/2010 |
| JP | 2014179265 A | 9/2014 |
| JP | 2017-18872 A | 1/2017 |
| WO | 2005040039 A | 5/2005 |

OTHER PUBLICATIONS

English Abstract for JP2010163356, Publication Date: Jul. 29, 2010.
Office Action in corresponding JP Application No. 2016-242370, dated Jul. 7, 2020 (pp. 1-3) and english machine translation (pp. 1-4).

* cited by examiner

*Primary Examiner* — Monique R Peets
(74) *Attorney, Agent, or Firm* — Millen White Zelano and Branigan, PC; John Sopp

(57) ABSTRACT

To provide a sulfur-containing complex having few impurities, a method for producing the complex at a higher production efficiency, and a method for producing a solid electrolyte using the complex, a sulfur-containing complex, containing a lithium sulfide and a lithium halide, exhibiting, in X-ray diffractometry using a CuKα ray, the diffraction angle of the peak of lithium halide shifting toward the diffraction angle of the peak of lithium sulfide, and not containing an oxygen-containing lithium halide represented by $Li_3OX$ (where X represents a halogen element) is provided. And a production method for a sulfur-containing complex including heating a solution containing a lithium hydrosulfide and a lithium halide in the presence of hydrogen sulfide is also provided.

9 Claims, 4 Drawing Sheets

COMPLEX COMPRISING SULFUR, A METHOD FOR MANUFACTURING THE SAME, AND A METHOD FOR MANUFACTURING A SOLID ELECTROLYTE

TECHNICAL FIELD

The present invention relates to a sulfur-containing complex, a method for producing it, and a method for producing a solid electrolyte.

BACKGROUND ART

In recent years, information processing devices and communication devices have become widespread, and downsizing of those devices is required. Batteries applicable for the devices are also desired to be downsized. As such batteries, lithium batteries have come to catch attention because they have high energy density and they can be downsized. In the lithium batteries, from the viewpoint of safety, all-solid lithium batteries have come to be employed, in which a solid electrolyte layer has been located instead of a conventional electrolytic solution. A sulfide solid electrolyte has been under development as the solid electrolyte to be used in the solid electrolyte layer.

Regarding the raw materials for a sulfide solid electrolyte, for example, lithium sulfide is used as a lithium source, and this is combined with a phosphorus compound such as diphosphorus pentasulfide and further with a lithium halide such as lithium bromide, or lithium iodide. Lithium sulfide may be produced, for example, according to a method of using lithium hydroxide and using a solvent or the like (for example, PTLs 1 and 2), and lithium halide may be produced according to a method of using an aqueous solution where lithium carbonate is dissolved in a hydrogen halide acid solution or a hydrogen halide gas is injected into an aqueous solution containing lithium carbonate (for example, NPLs 1 to 3). However, utilization of lithium sulfide and lithium halide obtained according to these methods as raw materials needs to remove the solvent and water by drying from them before use, and equipment and energy for drying are needed accordingly.

To eliminate such a drying step and for attain a higher production efficiency, a production method for a sulfide solid electrolyte having high productivity has been proposed. In the above method, hydrogen sulfide is made to circulate through a solution containing a lithium hydroxide and a lithium halide in a heating environment to sulfurize the lithium hydroxide into a lithium hydrosulfide, then the lithium hydrosulfide is processed for removing hydrogen sulfide to give a lithium sulfide, and the resultant lithium sulfide is used as a raw material for the solid electrolyte (for example, PTL 3).

CITATION LIST

Patent Literature

[PTL 1] JP-2010-163356A
[PTL 2] WO2005/040039A
[PTL 3] JP-2014-179265A

Non-Patent Literature

[NPL 1] "Encyclopaedia Chimica 4, Reduced Edition", edited by Encyclopaedia Chimica Editorial Committee, issued in 1993, published by Kyoritsu Publishing, p. 613

[NPL 2] "Encyclopaedia Chimica 9, Reduced Edition", edited by Encyclopaedia Chimica Editorial Committee, issued in 1993, published by Kyoritsu Publishing, p. 426

[NPL 3] "New Experimental Chemistry Course 8", edited by Encyclopaedia Chimica Editorial Committee, issued in 1978, published by Maruzen Publishing, pp. 461-462

SUMMARY OF INVENTION

Technical Problem

However, the present inventors have found that, in the method described in PTL 3, impurities such as an oxygen-containing lithium halide compound represented by $Li_3OX$ (where X represents a halogen element) are produced and the conversion into $Li_2S$ from the resultant Li compound to be a raw material is low accordingly.

The present invention has been made in consideration of the situation, and an object of the present invention is to provide a sulfur-containing complex with few impurities, a production method for producing the complex at a higher production efficiency, and a production method for a solid electrolyte using the complex.

Solution to Problem

The present inventors have assiduously studied for solving the above-mentioned problems and have found that the problems can be solved by the invention having the following constitution.

[1] A sulfur-containing complex, containing a lithium sulfide and a lithium halide, exhibiting, in X-ray diffractometry using a CuKα ray, the diffraction angle of the peak of lithium halide shifting toward the diffraction angle of the peak of lithium sulfide, and not containing an oxygen-containing lithium halide represented by $Li_3OX$ (where X represents a halogen element).

[2] The sulfur-containing complex according to the above [1], wherein the diffraction angle of the peak of lithium halide shifts toward the diffraction angle of the peak of lithium sulfide in at least (111) plane.

[3] The sulfur-containing complex according to the above [1] or [2], wherein the diffraction angle of the peak of lithium halide shifts by 0.1° or more toward the diffraction angle of the peak of lithium sulfide.

[4] The sulfur-containing complex according to any one of the above [1] to [3], wherein the lithium halide is at least one selected from lithium chloride, lithium bromide and lithium iodide.

[5] A method for producing a sulfur-containing complex, including heating a solution that contains a lithium hydrosulfide and a lithium halide in the presence of hydrogen sulfide.

[6] A method for producing a sulfur-containing complex, including mixing a lithium hydrosulfide solution and a lithium halide solution to give a solution containing a lithium hydrosulfide and a lithium halide, and heating the solution containing a lithium hydrosulfide and a lithium halide in the presence of hydrogen sulfide.

[7] A method for producing a sulfur-containing complex, including heating a solution containing a lithium hydroxide and a lithium halide under a temperature condition of 0° C. or higher and 100° C. or lower in the presence of hydrogen sulfide to give a solution containing a lithium hydrosulfide and a lithium halide, and heating the solution containing a lithium hydrosulfide and a lithium halide in the presence of hydrogen sulfide.

[8] The method for producing a sulfur-containing complex according to any one of the above [5] to [7], wherein in heating the solution containing a lithium hydrosulfide and a lithium halide in the presence of hydrogen sulfide, hydrogen sulfide is supplied at a flow rate of 0.01 N-L/min or more and 20 N-L/min or less relative to 1 kg of the solid content in the solution.

[9] The method for producing a sulfur-containing complex according to any one of the above [5] to [8], wherein in heating the solution containing a lithium hydrosulfide and a lithium halide in the presence of hydrogen sulfide, the heating is carried out at 100° C. or higher and 400° C. or lower.

[10] The method for producing a sulfur-containing complex according to any one of the above [5] to [9], wherein the lithium halide is at least one selected from lithium chloride, lithium bromide and lithium iodide.

[11] The method for producing a sulfur-containing complex according to any one of the above [7] to [10], wherein in obtaining the solution containing a lithium hydrosulfide and a lithium halide, hydrogen sulfide is supplied at a flow rate of 0.01 N-L/min or more and 20 N-L/min or less relative to 1 kg of the solid content in the solution.

[12] A method for producing a sulfide solid electrolyte, including reacting the sulfur-containing complex of any one of the above [1] to [4], and a phosphorus compound.

Advantageous Effects of Invention

According to the present invention, a sulfur-containing complex and a sulfide solid electrolyte with few impurities are able to be obtained at a higher production efficiency.

DESCRIPTION OF EMBODIMENTS

Embodiments of the present invention (hereinafter may be referred to as "the present embodiment") are described below. In this description, the numerical values of a value "or more" and a value "or less" relating to a numerical value range expression can be combined in any freely-selected manner.

[Sulfur-Containing Complex]

The sulfur-containing complex of the present embodiment contains a lithium sulfide and a lithium halide, exhibits, in X-ray diffractometry using a CuKα ray, the diffraction angle of the peak of lithium halide shifting toward the diffraction angle of the peak of lithium sulfide, and does not contain an oxygen-containing lithium halide represented by $Li_3OX$ (where X represents a halogen element).

(Lithium Sulfide)

Any lithium sulfide is usable with no specific limitation, and, for example, commercial products may be used as they are, or products produced according to a known method may be used, but high-purity products are preferred. At the time of producing the sulfur-containing complex of the present embodiment, lithium sulfide itself does not have to be a starting material, and, for example, lithium hydrosulfide may be used as a starting material to be lithium sulfide in the produced sulfur-containing complex, like in the production method for a sulfur-containing complex of the present embodiment to be mentioned hereinunder.

(Lithium Halide)

Preferred examples of the lithium halide include lithium fluoride, lithium chloride, lithium bromide, lithium iodide. From the viewpoint of ionic conductivity, lithium chloride, lithium bromide and lithium iodide are more preferred, and lithium bromide and lithium iodide are even more preferred. One alone or plural kinds of lithium halides may be used either singly or as combined.

(Diffraction Angle of Peak)

In this description, "the diffraction angle of the peak of lithium halide shifts toward the diffraction angle of the peak of lithium sulfide" means that "the difference between the diffraction angle of the peak of lithium halide and the diffraction angle of the peak of lithium sulfide in the sulfur-containing complex is smaller than the difference between the diffraction angle of the peak of lithium halide simple substance and the diffraction angle of the peak of lithium sulfide simple substance". More specifically, this is described with reference to the X-ray diffraction spectrum in X-ray diffractometry using a CuKα ray of the sulfur-containing complex obtained in Example shown in FIG. 1, and the enlarged illustration of the X-ray diffraction spectrum at (111) plane in X-ray diffractometry using a CuKα ray of the sulfur-containing complex obtained in Example shown in FIG. 2.

Figure 1:
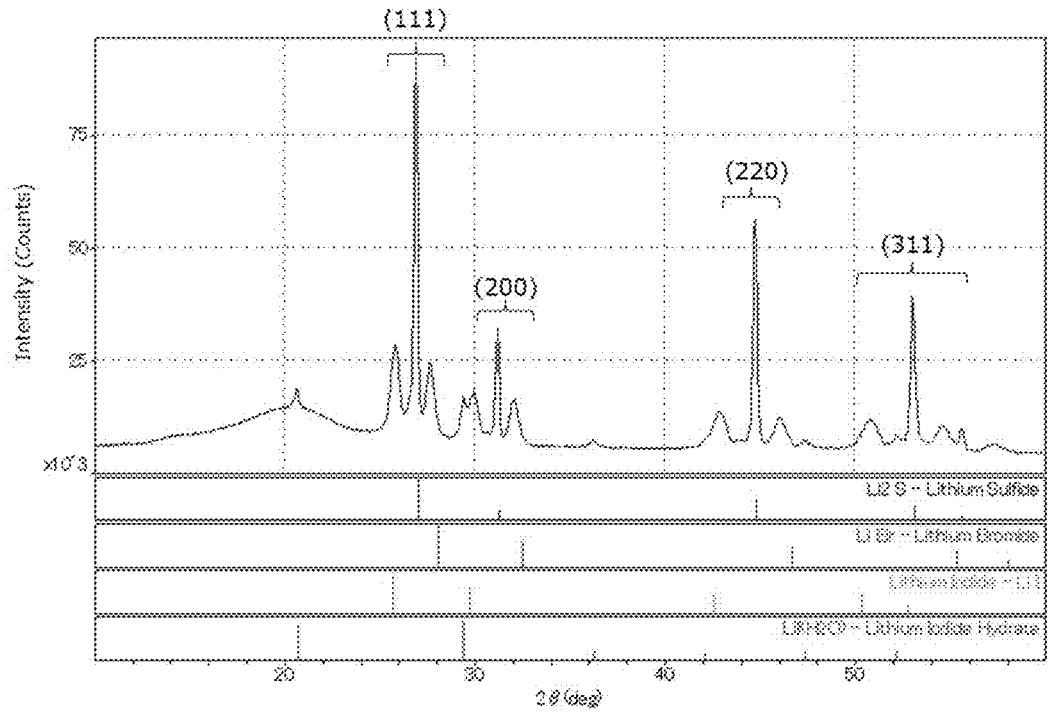
FIG. 1 is an X-ray diffraction spectrum of the sulfur-containing complex obtained in Example 1.

In the sulfur-containing complex of the present embodiment, lithium sulfide and lithium halide are known to have the same cubic crystal structure, and provide the two peaks at different planes as shown in FIG. 1 depending on the difference in the atomic radius between halogen and sulfur. In addition, at each different plane, for example, at (111) plane, peaks of lithium sulfide and lithium halide (lithium bromide and lithium iodide) are expressed as in FIG. 2.

Figure 2:
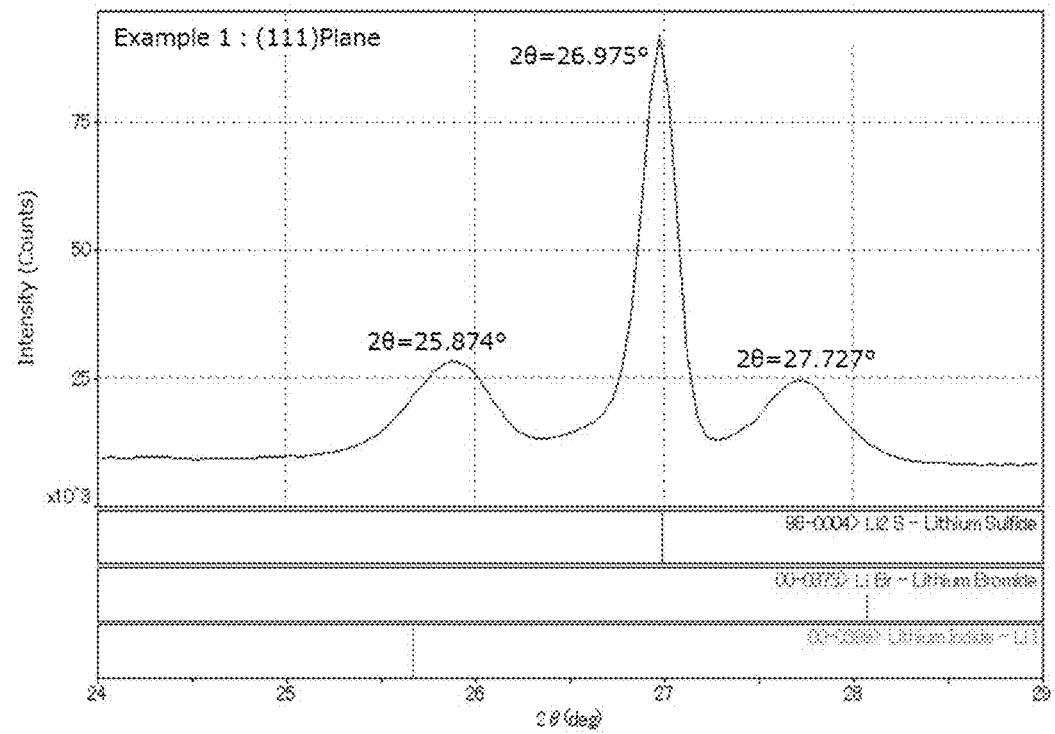
FIG. 2 is an enlarged illustration of the X-ray diffraction spectrum at (111) plane of the sulfur-containing complex obtained in Example 1.
Figure 3:
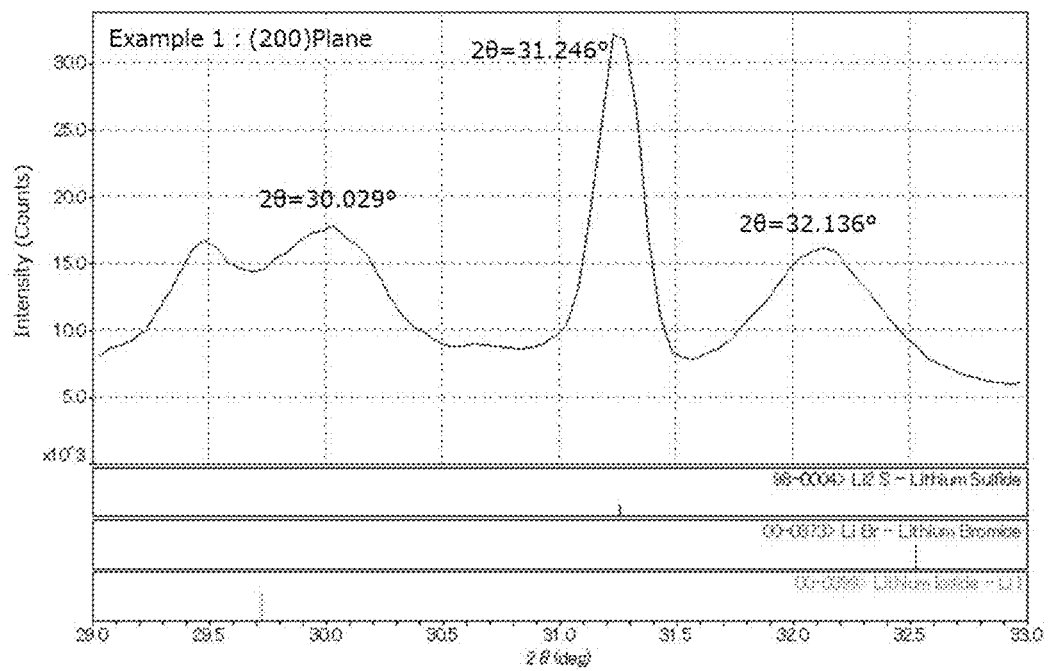
FIG. 3 is an enlarged illustration of the X-ray diffraction spectrum at (200) plane of the sulfur-containing complex obtained in Example 1.
Figure 4:
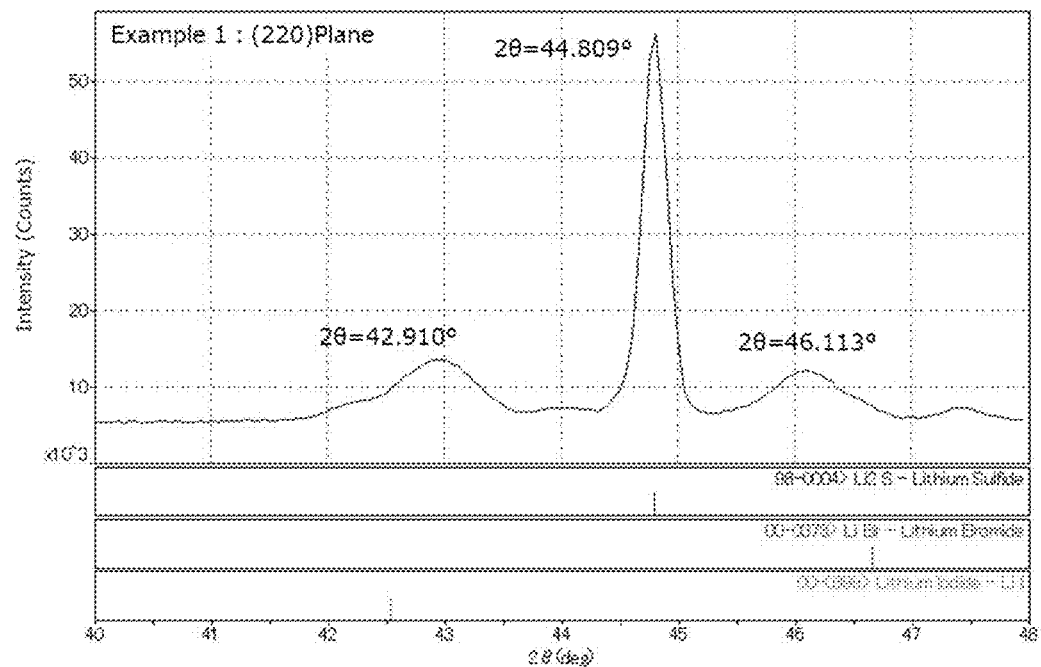
FIG. 4 is an enlarged illustration of the X-ray diffraction spectrum at (220) plane of the sulfur-containing complex obtained in Example 1.
Figure 5:
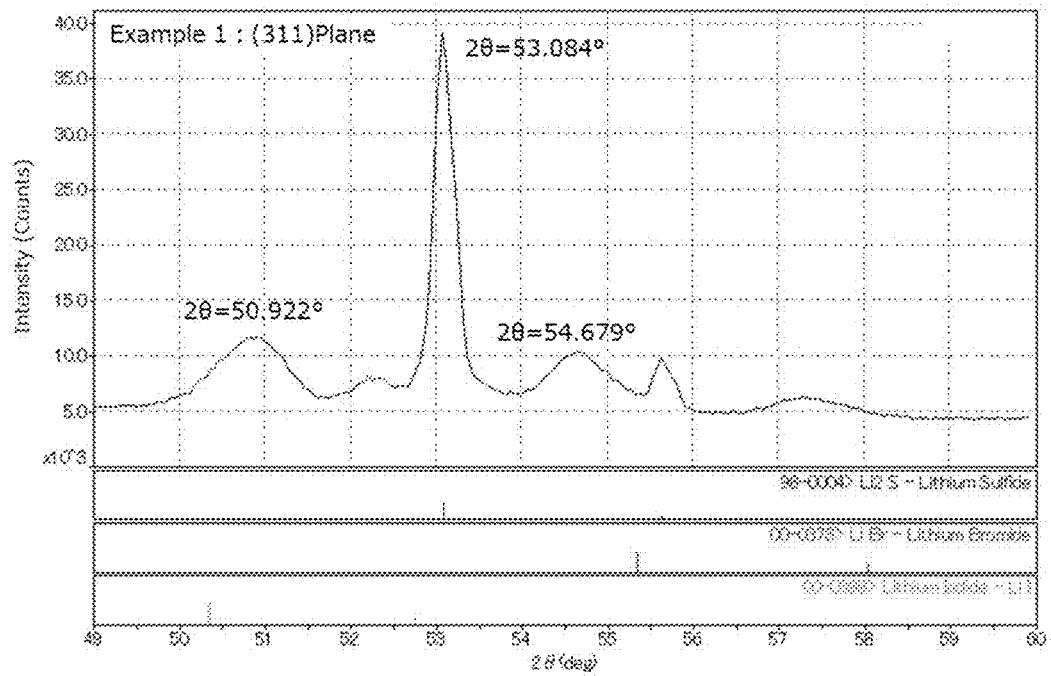
FIG. 5 is an enlarged illustration of the X-ray diffraction spectrum at (311) plane of the sulfur-containing complex obtained in Example 1.

FIG. 2 shows that the diffraction angle of the peak of lithium sulfide is 26.975°, the diffraction angle of lithium bromide is 27.727°, and the diffraction angle of lithium iodide is 25.874°, each of which is in the sulfur-containing complex. On the other hand, as a simple substance, the diffraction angle of lithium sulfide is 26.962°, the diffraction angle of lithium bromide is 28.046°, and the diffraction angle of lithium iodide is 25.643874° (also see Table 2). It is apparent from these results that the difference in the diffraction angle between lithium sulfide and lithium bromide as a simple substance is 1.084°, but the difference in the diffraction angle between lithium sulfide and lithium bromide in the sulfur-containing complex is 0.752°, that is, the difference in the diffraction angle between lithium sulfide and lithium bromide in the sulfur-containing complex is smaller by 0.332° than the difference in the diffraction angle between lithium sulfide and lithium bromide as a simple substance. This means that the diffraction angle of the peak of lithium bromide shifts toward the diffraction angle of the peak of lithium sulfide.

The same as that of lithium bromide shall apply also to lithium iodide. The difference in the diffraction angle between lithium sulfide and lithium iodide as a simple substance is 1.319°, while the difference in the diffraction angle between lithium sulfide and lithium iodide in the sulfur-containing complex is 1.101°, that is, the difference in the diffraction angle between lithium sulfide and lithium iodide as the sulfur-containing complex is smaller by 0.218° than the difference in the diffraction angle between lithium sulfide and lithium iodide as a simple substance. The diffraction angle of the peak of lithium iodide also shifts towards to the diffraction angle of the peak of lithium sulfide accordingly.

The sulfur-containing complex of the present embodiment shows, in X-ray diffractometry using a CuKα ray, the diffraction angle of the peak of lithium halide shifting toward the diffraction angle of the peak of lithium sulfide. The shift phenomenon does not occur in a simple substance of lithium sulfide and in a simple substance of lithium halide. In addition, it is known that lithium sulfide and lithium halide have the same cubic crystal structure, and halogen and sulfur atoms provide a peak at a different plane owing to the difference in the atomic radius between these atoms. In consideration of the facts, it may be said that lithium sulfide and lithium halide have an interrelationship on a molecular level in the sulfur-containing complex of the present embodiment, and these bond to form a complex structure.

In the sulfur-containing complex of the present embodiment, the shift of the diffraction angle of the above-mentioned peak may occur in any plane of (111) plane, (200) plane, (220) plane or (311) plane, but from the viewpoint of containing few impurities, preferably, the shift occurs in at least (111) plane, more preferably in (111) plane and at least one plane selected from (200) plane, (220) plane and (311) plane, and even more preferably the shift occurs in all planes of (111) plane, (200) plane, (220) plane and (311) plane.

In the sulfur-containing complex of the present embodiment, preferably, the diffraction angle of the peak of lithium halide in (111) plane shifts toward the diffraction angle of the peak of lithium sulfide by generally 0.1° or more, and for lithium iodide, preferably, the shift is by 0.1° or more, more preferably by 0.15° or more, even more preferably by 0.2° more. For lithium bromide, the shift width of the diffraction angle of peak is preferably 0.1° or more, more preferably 0.2° or more, even more preferably 0.25° or more. When the shift width of the diffraction angle of the peak of lithium halide toward the diffraction angle of the peak of lithium sulfide (hereinafter this may be simply referred to as "lithium halide shift width") falls within the above range, the sulfur-containing complex of the present embodiment may contain fewer impurities. Here, the lithium halide shift width is an absolute value of the difference between the diffraction angle of the peak of lithium halide as a simple substance and the diffraction angle of the peak of lithium halide in the sulfur-containing complex. For the complex containing two or more kinds of lithium halides, preferably, the shift width of all the lithium halides is 0.1° or more.

The sulfur-containing complex of the present embodiment is, from the viewpoint of reducing more the impurities therein, preferably such that the difference in the diffraction angle of the peak between lithium sulfide as a simple substance and lithium sulfide in the sulfur-containing complex (hereinafter this may be simply referred to as "shift width of lithium sulfide") is smaller than the shift width of lithium halide, more preferably smaller by 0.1° or more, even more preferably smaller by 0.2° or more, still more preferably smaller by 0.21° or more. In the case where the sulfur-containing complex of the present embodiment contains two or more kinds of lithium halides, the shift width of lithium sulfide is preferably smaller than the shift width of all the lithium halides.

Regarding the other planes than the above-mentioned (111) plane, that is, (200) plane, (220) plane and (311) plane, preferably, the shift width is smaller by 0.2° or more in (200) plane, more preferably by 0.25° more, even more preferably by 0.3° or more, is preferably smaller by 0.3° or more in (220) plane, more preferably by 0.35° or more, even more preferably by 0.4° more, and is preferably by 0.5° or more in (300) plane, more preferably by 0.55° or more, and even more preferably by 0.6° or more.

(Peak Intensity)

Preferably, in the sulfur-containing complex of the present embodiment, the peak intensity of lithium sulfide in (111) plane is larger than the peak intensity of lithium halide therein. Having the constitution, the complex may contain fewer impurities. Also in the other planes than (111) plane, for example, in (200) plane, (220) plane and (311) plane, preferably, the peak intensity of lithium sulfide is larger than the peak intensity of lithium halide.

(Oxygen-Containing Lithium Halide Represented by $Li_3OX$)

The sulfur-containing complex of the present embodiment does not contain an oxygen-containing lithium halide represented by $Li_3OX$ (where X represents a halogen element). The halogen element X in $Li_3OX$ is mainly derived from the halogen element contained in raw materials such as lithium halide, and includes fluorine, chlorine, bromine, and iodine.

The oxygen-containing lithium halide represented by $Li_3OX$ (where X represents a halogen element) may form in the production process for the sulfur-containing complex. Formation of the oxygen-containing lithium halide inhibits sulfurization to be desired even though hydrogen sulfide is supplied, subsequently, the purity of the resultant sulfur-containing complex may lower. In addition, it is known that the oxygen-containing lithium halide lower the battery performance of sulfide solid electrolytes and is said to be an impurity. The sulfur-containing complex of the present embodiment does not contain the oxygen-containing lithium halide, and can therefore give a sulfide solid electrolyte having more excellent battery performance.

In the present embodiment, "not containing an oxygen-containing lithium halide represented by $Li_3OX$ (where X represents a halogen element)" means that the sulfur-containing complex of the present embodiment may exceptionally contain the oxygen-containing lithium halide in an extremely small amount to such an extent that the oxygen-containing lithium halide does not cause any essential negative influence on the battery performance, the quality or other properties of a solid electrolyte, when the sulfur-containing complex is used as a raw material of the sulfide solid electrolyte. With respect to "an extremely small amount", in X-ray diffractometry using a CuKα ray, the rate of the maximum peak intensity of the oxygen-containing lithium halide relative to the maximum peak intensity of lithium sulfide or lithium halide is preferably 5% or less, more preferably 3% or less, even more preferably 1% or less, and it is especially preferable that the amount of the oxygen-containing lithium halide is not more than the detection limit thereof, that is, the oxygen-containing lithium halide is not substantially detected.

Also preferably, the sulfur-containing complex of the present embodiment does not also contain a lithium halide hydrate salt or the like, for example, LiX(H$_2$O) or Li$_2$X(OH). This is because these lithium halide hydrate salts are also formed during the production process and may worsen battery performance, like the above oxygen-containing lithium halide. Here, the meaning of "not containing" is the same as that of "not containing" for the above-mentioned oxygen-containing lithium halide.

(Mean Particle Size)

The mean particle size of the sulfur-containing complex of the present embodiment may be appropriately selected depending on the intended purpose and is not specifically limited, but is, for example, 1 μm or more, 5 μm or more, 10 μm or more, 30 μm or more, and 50 μm or more, and is 2000 μm or less, 1500 μm or less, 1000 μm or less, 500 μm or less, or 300 μm or less. Here, the mean particle size is a value measured using a laser diffraction particle distribution measuring apparatus (for example, Master Sizer manufactured by Malvern Instruments, Ltd.).

(Use)

The sulfur-containing complex of the present embodiment has, as described above, a structure of lithium sulfide and lithium halide bond to form a complex structure on a molecular level, and therefore has high reactivity with any other raw materials such as diphosphorus pentasulfide to be used as raw materials for sulfide solid electrolytes. In addition, the content of impurities therein is small, and therefore the complex may readily give sulfide solid electrolytes having more excellent battery performance.

As having such characteristics, the sulfur-containing complex of the present embodiment is favorably used as a raw material for sulfide solid electrolytes. The sulfide solid electrolyte to be obtained is favorably used in lithium ion secondary batteries, more specifically for a solid electrolyte layer of an all-solid lithium ion secondary battery, or for a solid electrolyte to be mixed in a positive electrode or negative electrode mixture. For example, placing a layer of a solid electrolyte between a positive electrode and a negative electrode provides an all-solid lithium ion secondary battery.

[Production Method for Sulfur Containing Complex]

A production method for the sulfur-containing complex of the present embodiment includes heating a solution containing a lithium hydrosulfide and a lithium halide in the presence of hydrogen sulfide. In the present embodiment, the solution includes not only a liquid but also a slurry (for example, exceeding a saturation concentration and in the form of a mixture of solution and powder).

(Lithium Hydrosulfide)

Lithium hydrosulfide may be a commercially-available one, or, as described below, may be one obtained through sulfurization of lithium hydroxide. From the viewpoint of obtaining a high-purity lithium sulfide, a lithium hydrosulfide having few impurities is preferably used. If desired, insoluble substances may be removed from the solution containing a lithium hydrosulfide and a lithium halide, through filtration or the like.

(Lithium Halide)

Preferred examples of the lithium halide include lithium fluoride, lithium chloride, lithium bromide, and lithium iodide, and from the viewpoint of ionic conductivity, lithium bromide and lithium iodide are more preferred. One alone or plural kinds of lithium halides may be used either singly or as combined.

Lithium halide may be a commercially-available one, or may be in the form of a solution prepared by dissolving it in a solvent such as water, or may be a solution obtained according to the method of dissolving lithium carbonate in a hydrohalic acid as described in the above-mentioned PTLs 1 and 2. Here, for example, when hydrobromic acid is used as a hydrohalic acid, lithium bromide is obtained; and when hydroiodic acid is used, lithium iodide is obtained.

In addition, a solution obtained according to a method of injecting a hydrogen halide into a slurry of lithium carbonate dispersed in water, as described in NPL 3, is also usable. Here, for example, when hydrogen bromide is used as a hydrogen halide, lithium bromide is obtained; and when hydrogen iodide is used, lithium iodide is obtained.

(Preparation of Solution Containing Lithium Hydrosulfide and Lithium Halide)

The solution containing a lithium hydrosulfide and a lithium halide can be obtained by, for example, (a) dissolving commercially-available lithium hydrosulfide and lithium halide in a solvent such as water, (b) mixing a lithium hydrosulfide solution and a lithium halide solution, or (c) heating a solution of a lithium hydroxide and a lithium halide in the presence of hydrogen sulfide under a temperature condition of 0° C. or higher and 50° C. or lower.

(Preparation of Solution According to (a))

The content of the lithium hydrosulfide and the lithium halide in the solution containing a lithium hydrosulfide and a lithium halide may be appropriately determined such that the ratio thereof is the desired compositional ratio in a sulfide solid electrolyte, and for example, the content of lithium hydrosulfide is, when it is liquid, preferably 3% by mass or more, more preferably 5% by mass or more. The upper limit is preferably 50% by mass or less, more preferably 30% by mass or less. When the content of the lithium hydrosulfide falls within the above range, the solution is easy to handle and lithium sulfide can be obtained easily, and the sulfur-containing complex to be obtained can be used easily as a raw material for sulfide solid electrolytes. In addition, the energy necessary for heating the solution containing a lithium hydrosulfide and a lithium halide can be reduced more.

The content of the lithium halide in the solution containing a lithium hydrosulfide and a lithium halide is, for example, preferably 1% by mass or more when liquid, more preferably 2% by mass or more. The upper limit is preferably 50% by mass or less, more preferably 30% by mass or less. When the content of the lithium halide falls within the above range, the solution is easy to handle, and the sulfur-containing complex to be obtained can be used easily as a raw material for sulfide solid electrolytes, and the energy necessary for heating the solution containing a lithium hydrosulfide and a lithium halide can be reduced more.

(Preparation of Solution According to (b))

In the case where the solution containing a lithium hydrosulfide and a lithium halide is obtained by mixing a lithium hydrosulfide solution and a lithium halide solution, the content of the lithium hydrosulfide, the content of the lithium halide, and the blending ratio of the lithium hydrosulfide solution and the lithium halide solution may be appropriately determined depending on the compositional ratio of the desired sulfide solid electrolyte. The content of the lithium hydrosulfide in the lithium hydrosulfide solution is, when it is liquid, for example, preferably 0.1% by mass or more, more preferably 1% by mass or more, even more preferably 5% by mass or more. The upper limit is preferably 50% by mass or less, more preferably 30% by mass or less, even more preferably 20% by mass or less. When the content of the lithium hydrosulfide falls within the above range, the solution is easy to handle, and can readily mix in the lithium halide solution, and the energy necessary for heating the solution containing a lithium hydrosulfide and a lithium halide can be reduced more.

The content of the lithium halide in the lithium halide solution is, when liquid, for example, preferably 0.1% by mass or more, more preferably 1% by mass or more, even more preferably 5% by mass or more. The upper limit is preferably 50% by mass or less, more preferably 30% by mass or less, even more preferably 20% by mass or less. When the content of the lithium halide falls within the above range, the solution is easy to handle, and the resultant sulfur-containing complex can be easily used as a raw material for sulfide solid electrolytes, and the energy necessary for heating the solution containing a lithium hydrosulfide and a lithium halide can be reduced more.

The lithium hydrosulfide solution can be obtained by reacting a lithium hydroxide solution and hydrogen sulfide.

The lithium hydroxide for use herein is not specifically limited, and may be a hydrate such as lithium hydroxide monohydrate ($LiOH \cdot H_2O$), or may also be anhydrous lithium hydroxide, and any industrially-available one can be used directly as it is.

From the viewpoint of obtaining a high-purity lithium sulfide, those containing few impurities are preferably used. If desired, the insoluble substances may be removed from the solution containing a lithium hydroxide and a lithium halide through filtration, etc.

The purity of hydrogen sulfide is not specifically limited, but one having a small content of impurities such as carbon dioxide, ammonia and others is preferably used. Using hydrogen sulfide containing few impurities gives lithium hydrosulfide having a higher purity, and as a result, a sulfur-containing complex containing few impurities can be obtained.

For the content of lithium hydroxide in the lithium hydroxide solution, a suitable concentration may be selected in accordance with the operational condition such as handleability and transportability. For the fluidal lithium hydroxide solution, the content of lithium hydroxide therein is preferably 0.1% by mass or more, more preferably 1% by mass or more, and even more preferably 3% by mass or more. The upper limit is preferably 50% by mass or less, more preferably 30% by mass or less, even more preferably 15% by mass or less. When the content of lithium hydroxide falls within the range, the solution is easy to handle and can readily mix with a lithium halide solution. In addition, the solution may be in the form of a slurry containing lithium hydroxide over a saturation concentration.

The supply method for hydrogen sulfide is not specifically limited so far as the compound could exist to be in contact with the solution containing a lithium hydroxide, and for example, hydrogen sulfide may be injected into the solution containing a lithium hydroxide (by bubbling) for the intended supply, or may be injected into the gaseous phase to be circulated therethrough for the intended supply. From the viewpoint that lithium hydroxide and hydrogen sulfide could be kept in contact in a more preferred manner, preferably, hydrogen sulfide is injected into the solution containing a lithium hydroxide for the intended supply. By supplying hydrogen sulfide, hydrogen sulfide may react with lithium hydroxide in the solution to give lithium hydrosulfide. In the case where the solution containing a lithium hydroxide is in the form of a slurry, the lithium hydroxide in the slurry may also react with hydrogen sulfide along with the lithium hydroxide dissolving in the solution, thereby giving lithium hydrosulfide.

The amount of hydrogen sulfide to be supplied is not specifically limited, and may be appropriately determined depending on the amount of the solution containing a lithium hydroxide to be used, the reaction temperature, the capacity of the reactor, etc., and for example, the amount may be 0.01 N-L/min or more relative to 1 kg of the solid content in the solution, or 1 N-L/min or more, and the upper limit is 20 N-L/min or less, or 10 N-L/min or less.

The reaction temperature is not specifically limited, and is, for example, preferably room temperature (20° C.) or higher, more preferably 40° C. or higher, even more preferably 50° C. or higher. The upper limit is preferably the boiling point of the solvent or lower (for water used as the solvent, the temperature is 100° C. or lower), more preferably 90° C. or lower, even more preferably 85° C. or lower.

The reaction pressure is not specifically limited, but is, from the viewpoint of equipment cost reduction, preferably normal pressure. For a pressurized equipment, hydrogen sulfide may be supplied as liquid, and thus the reaction speed may be controlled.

(Preparation of Solution According to (c))

The solution containing a lithium hydrosulfide and a lithium halide can be obtained by heating a solution containing a lithium hydroxide and a lithium halide in the presence of hydrogen sulfide under a temperature condition of 0° C. or higher and 100° C. or lower. Reacting with hydrogen sulfide, the lithium hydroxide can be sulfurized to give a lithium hydrosulfide.

The solution containing a lithium hydroxide and a lithium halide can be obtained, for example, by dissolving a lithium hydroxide and a lithium halide in a solvent such as water, or can also be obtained by mixing a lithium hydroxide solution and a lithium halide solution.

The content of the lithium hydroxide in the solution containing a lithium hydroxide and a lithium halide is preferably 1% by mass or more, more preferably 3% by mass or more, even more preferably 5% by mass or more. The upper limit is preferably 50% by mass or less, more preferably 30% by mass or less, even more preferably 20% by mass or less. When the content of lithium hydroxide falls within the above range, the solution is easy to handle and gives lithium hydrosulfide easily, and the resultant sulfur-containing complex can be used easily as a raw material for sulfide solid electrolytes.

The content of the lithium halide in the solution containing a lithium hydroxide and a lithium halide is the same as the content of the lithium halide in the solution containing a lithium hydrosulfide and a lithium halide mentioned above.

The content of the lithium halide in the lithium halide solution is the same as that in the lithium halide solution in the case where the solution containing a lithium hydrosulfide and a lithium halide is obtained using a lithium halide solution.

In obtaining the solution containing a lithium hydrosulfide and a lithium halide, hydrogen sulfide may exist to be in contact with the solution containing a lithium hydroxide and a lithium halide, and the supply method is not specifically limited. For example, for the supply, a method of injecting hydrogen sulfide into the solution, as described in the section of "Preparation of Solution according to (b)", is preferred.

The supply amount of hydrogen sulfide is not specifically limited, and may be appropriately determined in accordance with, for example, the amount of the solution containing a lithium hydroxide and a lithium halide to be used, the reaction temperature, the capacity of the reaction equipment to be used. For example, the amount may be 0.01 N-L/min or more relative to 1 kg of the solid content in the solution, or 1 N-L/min or more, and the upper limit may be 20 N-L/min or less, or 10 N-L/min or less.

The reaction temperature is set under a condition of 0° C. or higher and 100° C. or lower. When heated at a low temperature under the condition, the solution gives lithium hydrosulfide more efficiently, without forming impurities of the above-mentioned oxygen-containing lithium halide compounds, lithium halide hydrates, etc., and as a result, a sulfur-containing complex can be obtained more efficiently.

The reaction pressure, the reaction time and the reaction apparatus are the same as those for the reaction of a lithium hydroxide solution and hydrogen sulfide in the section of "Preparation according to (b)" mentioned above.

The molar ratio of the molar amount of lithium element (Li) derived from lithium hydrosulfide to the molar amount of lithium element ($Li_2$) derived from lithium halide in the solution containing a lithium hydrosulfide and a lithium halide obtained according to the method mentioned above, ($Li_1/Li_2$) is preferably 1 or more, more preferably 2 or more, even more preferably 4 or more. The upper limit is preferably 100 or less, more preferably 50 or less, even more preferably 20 or less. When the molar ratio ($Li_1/Li_2$) falls within the above range, a sulfide solid electrolyte excellent in battery characteristics is easy to obtain.

The solutions described in the above sections "Preparation of Solution according to (a)", "Preparation of Solution according to (b)" and "Preparation of solution according to (c)", that is, the solution containing a lithium hydrosulfide and a lithium halide, the solution containing a lithium hydrosulfide, the solution containing a lithium halide, the solution containing a lithium hydroxide and a lithium halide, and a solution containing a lithium hydroxide are preferably aqueous solutions containing water as a solvent. The aqueous solutions also include a liquid form and a slurry form (for example, mixture of solution and powder) same as the solutions.

The solvent in the aqueous solution may be water alone acting as a solvent, or may further contain any other solvent than water. For the solvent containing water and any liquid other than water, the proportion of water to the total solvent is preferably 50% by mass or more, more preferably 60% by mass or more, even more preferably 80% by mass or more.

Water is not specifically limited, but is preferably distilled water or ion-exchanged water generally used in the art.

The other solvent than water may be any one not forming impurities by reaction with no specific limitation, and examples thereof include a polar solvent such as alcohol or ether. The alcohol may be an alcohol having 1 to 8 carbon atoms, and examples thereof include methanol, ethanol, propanol, pentanol and methylbutanol.

In the present embodiment, the solvent in the solution containing a lithium hydrosulfide and a lithium halide, the solution containing a lithium hydrosulfide, the solution containing a lithium halide, the solution containing a lithium hydroxide and a lithium halide, and the solution containing a lithium hydroxide may be all water. Without using any other solvent such as the above-mentioned organic solvent, a single solvent may be used to produce the sulfur-containing complex, and the production efficiency is bettered.

(Supply of Hydrogen Sulfide and Heating)

In the present embodiment, heating the solution containing a lithium hydrosulfide and a lithium halide needs to be carried out in the presence of hydrogen sulfide. When heated in the absence of hydrogen sulfide, impurities such as the above-mentioned oxygen-containing lithium halide compounds, lithium halide hydrates may form and a sulfur-containing complex could not be produced efficiently. In general, heating of lithium hydrosulfide forms hydrogen sulfide through the reaction of hydrogen sulfide removal, and consequently in this reaction system, when hydrogen sulfide is supplied, the reaction could hardly go on because of chemical equilibrium. In the present embodiment, the present inventors have hit the unexpected effect that the generation of impurities such as those mentioned above can be suppressed by supply of hydrogen sulfide.

Hydrogen sulfide may exist in contact with the solution containing a lithium hydrosulfide and a lithium halide, and the supply method is not specifically limited. For example, hydrogen sulfide may be injected into the solution containing a lithium hydrosulfide and a lithium halide for supply thereof (bubbling) or may be injected into a gaseous phase for circulation therethrough, as described in the section of (Preparation of Solution according to (b)). From the viewpoint of attaining efficient reaction, supply by injection into a gaseous phase for circulation therethrough is preferred.

Preferably, supply of hydrogen sulfide is continued until the solvent of the solution containing a lithium hydrosulfide and a lithium halide evaporates away to be in a dry state. Supplying until complete evaporation of the solvent can suppress more effectively the formation of lithium hydroxide through hydrolysis, and a sulfur-containing complex can be obtained more efficiently.

Whether or not the solvent has completely evaporated away may be known, for example, by condensing the vapor that contains the solvent such as water to be discharged out from the reaction tank, in a condenser or the like, and by detecting the termination of discharging of the solvent such as water. By discharging the solvent such as water out of the reaction system in that manner, a lithium sulfide and a lithium halide may precipitate and the liquid solution becomes slurry, and further after that, a sulfur-containing complex can be obtained.

The supply amount of hydrogen sulfide is not specifically limited, and may be adequately determined depending on conditions such as the amount of the solution containing a lithium hydrosulfide and a lithium halide to be used, the reaction temperature and the capacity of the reaction apparatus. For example, the amount is 0.01 N-L/min or more or 1 NIL-min or more relative to 1 kg of the solid content of the solution, and the upper limit is 20 N-L/min or less, or 10 N-L/min or less.

The heating temperature is preferably the boiling point of the solvent or higher, and when the solvent is water, the temperature is preferably 100° C. or higher, more preferably 110° C. or higher, even more preferably 120° C. or higher. The upper limit is not specifically limited, and is, for example, preferably 400° C. or lower, more preferably 350° C. or lower, even more preferably 320° C. or lower.

The heating may be carried out at the same temperature or at a different temperature. For example, after a drying and heating step of evaporating the solvent preferably at 100° C. or higher and 150° C. or lower, more preferably at 120° C. or higher and 140° C. or lower, a hydrogen sulfide removing step may be carried out preferably at 250° C. or higher and 400° C. or lower, more preferably at 270° C. or higher and 350° C. or lower. From the viewpoint of obtaining a sulfur-containing complex more efficiently, preferably, the system is heated at a heating temperature differing depending on the intended purpose.

The apparatus to be used in heating the solution containing a lithium hydrosulfide and a lithium halide in the presence of hydrogen sulfide may be, for example, an apparatus equipped with a reactor having a stirring blade, an introduction unit for introducing hydrogen sulfide into the reactor, a discharge unit for discharging an excessive hydrogen sulfide and a solvent such as water and condensing and recovering the solvent with a condenser or the like, and a heating and cooling unit for heating and cooling the raw materials in the reactor. The apparatus may also has a unit for recycling the discharged hydrogen sulfide into the reactor.

(Grinding)

In the production method of the present embodiment, the sulfur-containing complex obtained according to the above-mentioned method may be ground. For grinding the sulfur-containing complex, grinding machines responding to the throughput, for example, various types of grinding machines for use in the production method for sulfide solid electrolytes to be mentioned hereinunder may be employed.

The mean particle size of the sulfur-containing complex may be appropriately selected depending on the intended purpose and is not specifically limited. For example, the mean particle size may be 1 μm or more, 5 μm or more, 10 μm or more, 30 μm or more or 50 μm or more, and may be 2000 μm or less, 1500 μm or less, 1000 μm or less, 500 μm or less, or 300 μm or less. Here, the mean particle size is a value to be measured using a laser diffraction particle size distribution measuring apparatus (for example, Master Sizer 2000 manufactured by Malvern Instruments, Ltd.).

(Sulfur-Containing Complex)

The sulfur-containing complex obtained according to the production method of the present embodiment contains a lithium sulfide and a lithium halide, exhibits, in X-ray diffractometry using a CuKα ray, the diffraction angle of the peak of lithium halide shifting toward the diffraction angle of the peak of lithium sulfide, and does not contain an oxygen-containing lithium halide represented by $Li_3OX$ (where X represents a halogen element). The sulfur-containing complex of the present embodiment is not specifically limited in point of the production method thereof, but from the viewpoint of being a complex containing few impurities and having a high purity, the sulfur-containing complex is preferably one obtained according to the production method for a sulfur-containing complex of the present embodiment.

The sulfur-containing complex obtained according to the production method of the present embodiment has a structure of a lithium sulfide and a lithium halide as complexed on a molecular level, and thus, when used as a raw material for sulfide solid electrolytes, for example, the sulfur-containing complex has high reactivity with other raw materials such as diphosphorus pentasulfide and others and can provide a sulfide solid electrolyte more efficiently.

For the production method for a sulfur-containing complex of the present embodiment, the mixed solution tank for preparing solution and other ancillary facilities such as a heating unit and others may be consolidated and simplified to enhance the energy efficiency, whereby impurities such as the above-mentioned oxygen-containing lithium halide compounds, lithium halide hydrate salts and others, which may become impurities to lower the performance of sulfide solid electrolytes, may be prevented from forming. Thus, the production method for a sulfur-containing complex of the present embodiment can produce a sulfur-containing complex containing few impurities, at a high production efficiency.

[Production Method for Sulfide Solid Electrolyte]

The production method for a sulfide solid electrolyte of the present embodiment includes reacting the sulfur-containing complex of the present embodiment, that is, a sulfur-containing complex containing a lithium sulfide and a lithium halide, exhibiting, in X-ray diffractometry using a CuKα ray, the diffraction angle of the peak of lithium halide shifting toward the diffraction angle of the peak of lithium sulfide, and not containing an oxygen-containing lithium halide represented by $Li_3OX$ (where X represents a halogen element), with a phosphorus compound.

The phosphorus compound includes phosphorus sulfides such as diphosphorus trisulfide and diphosphorus pentasulfide, phosphate compounds such as sodium phosphate and lithium phosphate, and above all, phosphorus sulfides are preferred, and diphosphorus pentasulfide is more preferred. The phosphorus compound may include a simple substance phosphorus. The phosphorus compounds such as diphosphorus pentasulfide and others may be readily available so far as they are industrially produced and sold. One alone or plural kinds of these phosphorus compounds may be used either singly or as combined.

The ratio to be used of the lithium sulfide and the phosphorus compound (including not only a lithium sulfide simple substance but also a lithium sulfide capable of contributing toward a complex structure of a lithium sulfide and a lithium halide bonding to each other on a molecular level) in the sulfur-containing complex is preferably such a ratio that the resultant sulfide solid electrolyte could constitute an ortho composition or a composition close thereto. For diphosphorus pentasulfide used as the phosphorus compound, the ratio by mol of lithium sulfide and diphosphorus pentasulfide is preferably 65 to 85/15 to 35, more preferably 70 to 80/20 to 30, even more preferably 72 to 78/22 to 28. Here, ortho means a highest hydration degree among oxo acids obtained through hydration of the same oxide, and in the present embodiment, a crystal composition mostly added with lithium sulfide as a sulfide is referred to as an ortho composition. For the ortho composition, the ratio of lithium sulfide to diphosphorus pentasulfide is 75/25 by mol. The amount of the lithium sulfide (including not only a lithium sulfide simple substance but also a lithium sulfide capable of contributing toward a complex structure of a lithium sulfide and a lithium halide bonding to each other on a molecular level) in the sulfur-containing complex may be specified, for example, by the amount of the lithium hydrosulfide and the lithium hydroxide used in the production process.

The reaction of the sulfur-containing complex with the phosphorus compound may be carried out in a grinding step of wet grinding using a non-aqueous solvent or dry grinding.

(Wet Grinding)

Examples of the non-aqueous solvent for use in wet grinding include solvents for electrolytes, such as toluene, hexane, tetrahydrofuran (THF), N-methylpyrrolidone, acetonitrile, dimethoxyethane or dimethyl carbonate. The water content in these solvents is preferably 100 ppm by mass or less, more preferably 50 ppm by mass or less.

In wet grinding, the content of the solid (raw materials) in the solution (slurry) formed of a non-aqueous solvent and the raw materials of a sulfur-containing complex and a phosphorus compound may be adequately controlled, and is preferably 5% by mass or more, more preferably 7% by mass or more, even more preferably 10% by mass or more. The upper limit is preferably 50% by mass or less, more preferably 40% by mass or less, even more preferably 30% by mass or less. When the content of the solid (raw materials) falls within the above range, the solution is easy to handle and a sulfide solid electrolyte can be obtained more efficiently.

From the viewpoint of reducing the steps of wet grinding, preferably, a dispersion stabilizer is previously added to the non-aqueous solvent. This is because grinding of aggregates of primary particles of the raw materials (solid) can be promoted and the grinding efficiency can be thereby enhanced.

The dispersion stabilizer includes an amide-type dispersion stabilizer having an aliphatic alkyl group or an aryl group, an amine salt-type dispersion stabilizer, an ester-type dispersion stabilizer, a nitrile-type dispersion stabilizer, an ether-type dispersion stabilizer, and above all, esters are preferred. More specifically, there are mentioned an amide-type dispersion stabilizer such as lauroyldiethanolamide; an amine-type dispersion stabilizer such as lauryoldiethanolamine hydrochloride; a sulfur-containing ester-type dispersion stabilizer such as dioctyl sulfosuccinate; a nitrile-type dispersion stabilizer represented by R—C≡N (where R represents a group having a main chain of a hydrocarbon having 1 to 13 carbon atoms and a side chain of a hydrocarbon having 1 to 13 carbon atoms, or a group having a cyclic structure having 3 to 7 carbon atoms), such as isobutyronitrile, isovaleronitrile and benzonitrile; an ether-type dispersion stabilizer such as dimethyl ether, methyl ethyl ether, dipropyl ether, butyl ether, cyclopentylmethyl ether and anisole.

The content of the dispersion stabilizer in the solution containing a non-aqueous solvent and raw materials such as a sulfur-containing complex, a phosphorus compound and others is preferably 0.05% by mass or more, more preferably 0.1% by mass or more, even more preferably 1% by mass or more. The upper limit is preferably 5% by mass or less, more preferably 4% by mass or less, even more preferably 3% by mass or less. When the content of the dispersion stabilizer falls within the above range, the effect of improving the grinding efficiency can be more efficiently attained.

The wet-grinding machine for use in wet grinding is not specifically limited, and includes, for example, a bead mill, a planetary mill, a vibration mill. From the viewpoint of freely controlling the condition for grinding operation, a grinding machine using balls as grinding media is preferred. Examples of the grinding machine of the type include a tumbling ball mill, a bead mill, a planetary ball mill and a vibration ball mill.

For grinding carried out using a grinding machine with balls as grinding media, preferably, grinding with relatively large balls is followed by grinding with relatively small balls. Specifically, the diameter of the relatively large balls is preferably 1 mmϕ or more, more preferably 2 mmϕ or more, even more preferably 3 mmϕ, and the upper limit is preferably 50 mmϕ or less, more preferably 30 mmϕ or less, even more preferably 15 mmϕ or less. The diameter of the relatively small balls that are to be combined with the relatively large balls is not specifically limited so far as the diameter thereof is smaller than the diameter of the relatively large balls, and is, for example, preferably 0.03 mmϕ or more, more preferably 0.05 mmϕ or more, even more preferably 0.1 mmϕ or more, and the upper limit is preferably 5 mmϕ or less, more preferably 3 mmϕ or less, even more preferably 1 mmϕ or less.

The grinding condition for wet grinding may be appropriately controlled depending on the machine and others to be used. For a bead mill, for example, the blade chip speed may be approximately 2 m/sec or more and 20 m/sec or less, and the processing time may be approximately 10 minutes or more and 6 hours or less.

(Dry Grinding)

The dry grinding may be carried out, for example, using a kneading machine, a ball mill grinding machine, a jet grinding machine.

The condition for the dry grinding is not specifically limited, but from the viewpoint of preventing materials from being degraded or denatured, for example, the dry grinding is preferably carried out in an atmosphere of inert gas such as nitrogen or argon.

The inert gas pressure in the grinding is preferably 0.2 MPaG or more, more preferably 0.3 MPaG or more, even more preferably 0.5 MPaG or more, and the upper limit is preferably 2 MPaG or less, more preferably 1.8 MPaG or less, even more preferably 1.5 MPaG or less.

Regarding the temperature condition for the dry grinding, a low dew point environment is preferred from the viewpoint of preventing materials from being degraded or denatured, and specifically, the temperature is preferably 20° C. or higher, more preferably 25° C. or higher, even more preferably 30° C. or higher. The upper limit is preferably 100° C. or lower, more preferably 95° C. or lower, even more preferably 90° C. or lower.

The grinding time may be appropriately determined according to the grinding condition.

(Sulfide Solid Electrolyte)

A sulfide solid electrolyte can be obtained by reacting the sulfur-containing complex of the present embodiment and a phosphorus compound by a grinding process of the wet grinding or the dry grinding. The resultant sulfide solid electrolyte is an amorphous solid electrolyte containing at least a lithium element, a sulfur element, a phosphorus element and a halogen element. In this description, the amorphous solid electrolyte is such that, in X-ray diffractometry, the X-ray diffraction pattern thereof is a halo pattern not substantially showing any other peak than the peaks derived from the materials, irrespective of the presence or absence of peaks derived from the raw materials of the solid electrolyte.

Typical examples of the amorphous sulfide solid electrolyte obtained according to the production method for a sulfide solid electrolyte of the present embodiment include $Li_2S$—$P_2S_5$—LiI, $Li_2S$—$P_2S_5$—LiCl, $Li_2S$—$P_2S_5$—LiBr, $Li_2S$—$P_2S_5$—LiI—LiBr, $Li_2S$—$P_2S_5$—$Li_2O$—LiI and $Li_2S$—$SiS_2$—$P_2S_5$—LiI. The kind of the element constituting the amorphous sulfide solid electrolyte can be identified, for example, using an ICP emission spectrometric analyzer.

The shape of the amorphous sulfide solid electrolyte is not specifically limited, and is, for example, a granular one. The mean particle size ($D_{50}$) of the granular amorphous sulfide solid electrolyte is, for example, within a range of 0.01 μm or more and 500 μm or less, or 0.1 μm or more and 200 μm or less.

(Heating)

The production method for a sulfide solid electrolyte of the present embodiment may further includes heating. The heating allows the amorphous solid electrolyte to form into a crystalline solid electrolyte.

The heating temperature may be appropriately selected depending on the structure of the amorphous solid electrolyte. For example, using a differential thermal analyzer, an amorphous solid electrolyte is subjected to differential thermal analysis (DTA) at a heating condition of 10° C./min, and the heating temperature may be selected from the range of preferably ±40° C. starting from the peak top of the exothermic peak detected on the lowest temperature side during the analysis, more preferably within a range of ±30° C., even more preferably within a range of ±20° C.

More specifically, the heating temperature is preferably 150° C. or higher, more preferably 170° C. or higher, even more preferably 190° C. or higher. On the other hand, the upper limit of the heating temperature is not specifically limited, but is preferably 300° C. or lower, more preferably 280° C. or lower, even more preferably 250° C. or lower.

The heating time is not specifically limited so far as a desired crystalline solid electrolyte could be obtained within the heating time. For example, the heating time is preferably 1 minute or more, more preferably 10 minutes or more, even more preferably 30 minutes or more. The upper limit of the heating time is not specifically limited, and is preferably 24 hours or less, more preferably 10 hours or less, even more preferably 5 hours or less.

Preferably, the heating is carried out in an inert gas atmosphere (for example, in a nitrogen atmosphere or an argon atmosphere), or in a reduced-pressure atmosphere (especially in vacuum). This is because the crystalline solid electrolyte can be prevented from being degraded (for example, from being oxidized). The heating method is not specifically limited, and for example, a method of using a hot plate, a vacuum heating apparatus, an argon gas atmospheric furnace or a firing furnace may be employed. A horizontal drying machine, a horizontal vibrating fluidized drying machine or the like having a heating unit and a feed mechanism may be employed in an industrial production.
(Crystalline Sulfide Solid Electrolyte)

As described above, by heating the amorphous sulfide solid electrolyte, a crystalline sulfide solid electrolyte can be obtained. In this description, the crystalline solid electrolyte is a solid electrolyte of such that, in X-ray diffractometry, the X-ray diffraction pattern thereof give a peak derived from the solid electrolyte irrespective the presence or absence of peaks derived from the raw materials or the solid electrolyte. Specifically, the crystalline solid electrolyte may contain a crystal structure derived from the solid electrolyte, and a part thereof may be a crystal structure derived from the solid electrolyte or all may be a crystal structure derived from the solid electrolyte. The crystalline solid electrolyte may partly contain an amorphous solid electrolyte so far as it has the above-mentioned X-ray diffraction pattern.

More specifically, examples of the crystal structure of the crystalline solid electrolyte include an $Li_3PS_4$ crystal structure, an $Li_4P_2S_6$ crystal structure, an $Li_7PS_6$ crystal structure, a crystal structure having peaks at around 2θ=20.2° and 23.6° (for example, see JP-2013-16423A).

Here, a crystal structure having peaks at around 2θ=20.2° and 23.6° is preferred. One example is a crystal structure having peaks at 2θ=20.2°±0.3° and 23.6°±0.3°.

The shape of the crystalline sulfide solid electrolyte is not specifically limited, and is, for example, a granular one. The mean particle size ($D_{50}$) of the granular crystalline sulfide solid electrolyte falls, for example, within a range of 0.01 µm or more and 500 µm or less, or 0.1 µm or more and 200 µm or less.
(Use of Sulfide Solid Electrolyte)

The sulfide solid electrolyte obtained in the production method of the present embodiment has a high ionic conductivity and excellent battery performance and is favorably used for batteries. When a lithium element is used as the conductive species, the electrolyte is preferred for batteries. The sulfide solid electrolyte may be used in a positive electrode layer or a negative electrode layer, or may also be used in an electrolyte layer. Each layer may be formed according to a known method.

The battery prelerably include a collector in addition to the positive electrode layer, the electrolyte layer and the negative electrode layer. The collector may be a known one. For example, a layer formed by coating first metal such as Au, Pt, Al, Ti or Cu reactive with the above-mentioned solid electrolyte, with second metal such as Au may be used.

EXAMPLES

Next, concrete Examples of the present invention is described, but the present invention is not restricted by these Examples.
(Measurement of Content (Fraction) of Lithium Sulfide, Lithium Hydroxide and Lithium Carbonate)

The content of lithium sulfide, lithium hydroxide and lithium carbonate was measured through analysis by hydrochloric acid titration and silver nitrate titration. Specifically, the sulfur-containing complex obtained in Example was weighed in a glove box (dew point: −100° C. or so, nitrogen atmosphere), then dissolved in water and analyzed using a potentiometric titrator ("COM-980 (model number)", manufactured by Hiranuma Sangyo Co., Ltd.) for calculation.
(Calculation of Conversion)

From the content (fraction) of each compound, the lithium amount in lithium sulfide, lithium hydroxide and lithium carbonate was calculated, and the ratio thereof to the lithium in the anhydrous lithium hydroxide used as the raw material was referred to as the conversion.

Example 1: Production of Sulfur-Containing Complex

In a separable flask (made with SUS, 500 mL) equipped with an anchor blade, 15.15 g (0.633 mol) of anhydrous lithium hydroxide (manufactured by Honjo Chemical Corporation, water content: 1% by mass or less) and 150 mL of ion-exchanged water were put, and stirred at room temperature to give an aqueous lithium hydroxide solution. Hydrogen sulfide (manufactured by Sumitomo Seika Chemicals Co., Ltd.) was supplied to the aqueous lithium hydroxide solution at 200 N-mL/min for 2 hours with bubbling to give an aqueous lithium hydrosulfide solution. Apart from this, 7.53 g (0.0563 mol) of lithium iodide and 7.32 g (0.0843 mol) of lithium bromide (both by Honjo Chemical Corporation) were dissolved in 120 mL of ion-exchanged water to prepare a lithium halide solution, and put into the above-mentioned separable flask to be mixed with the lithium hydrosulfide solution therein, thereby producing an aqueous solution containing lithium hydrosulfide and lithium halide (lithium iodide and lithium bromide).

The separable flask with the aqueous solution containing lithium hydrosulfide, lithium iodide and lithium bromide therein was set in an oil bath at 130° C. and heated at 130° C. therein, and then hydrogen sulfide was fed into the vapor phase in the separable flask at 200 N-mL/min for 8 hours. The formed water was evaporated away and the residue was dried and further heated at 250° C. and kept as such for 8 hours.

Subsequently, hydrogen sulfide was switched to nitrogen gas, cooled to room temperature, and the powdery sulfur-containing complex in the separable flask was collected. The content of lithium sulfide, lithium hydroxide and lithium carbonate in the resultant sulfur-containing complex was measured. The content is shown in Table 1. The resultant sulfur-containing complex was analyzed through powdery X-ray diffractometry (XRD) using an X-ray diffractometer (XRD) (SmartLab Device, manufactured by Rigaku Corporation). The X-ray diffraction spectrum is shown in FIG. 1. Enlarged views at (111) plane, (200) plane, (220) plane and (311) plane are shown in FIGS. 2 to 5. At each plane, the diffraction angle of the peak of the simple substance of lithium sulfide, lithium bromide and lithium iodide, the diffraction angle of the peak thereof in the sulfur-containing complex and the shift width are shown in Table 2.

Comparative Example 1

In a separable flask (made with SUS, 500 mL) equipped with an anchor blade, 15.15 g (0.633 mol) of anhydrous lithium hydroxide (manufactured by Honjo Chemical Corporation, water content: 1% by mass or less) and 150 mL of ion-exchanged water were put, and stirred at room temperature to give an aqueous lithium hydroxide solution. Apart from this, 7.53 g (0.0563 mol) of lithium iodide and 7.32 g (0.0843 mol) of lithium bromide (both by Honjo Chemical Corporation) were dissolved in 120 mL of ion-exchanged water to prepare a lithium halide solution, and put into the above-mentioned separable flask to be mixed with the lithium hydroxide solution therein, thereby producing an aqueous solution containing lithium hydroxide and lithium halide (lithium iodide and lithium bromide).

The separable flask with the aqueous solution containing lithium hydroxide, lithium iodide and lithium bromide therein was set in an oil bath at 130° C. and heated at 130° C. therein, and then nitrogen was fed into the vapor phase in the separable flask at 200 N-mL/min for 8 hours. The formed water was evaporated away and the residue was dried, then nitrogen was switched to hydrogen sulfide at 200 N-mL/min, further heated at 250° C. and kept as such for 8 hours.

Figure 6:
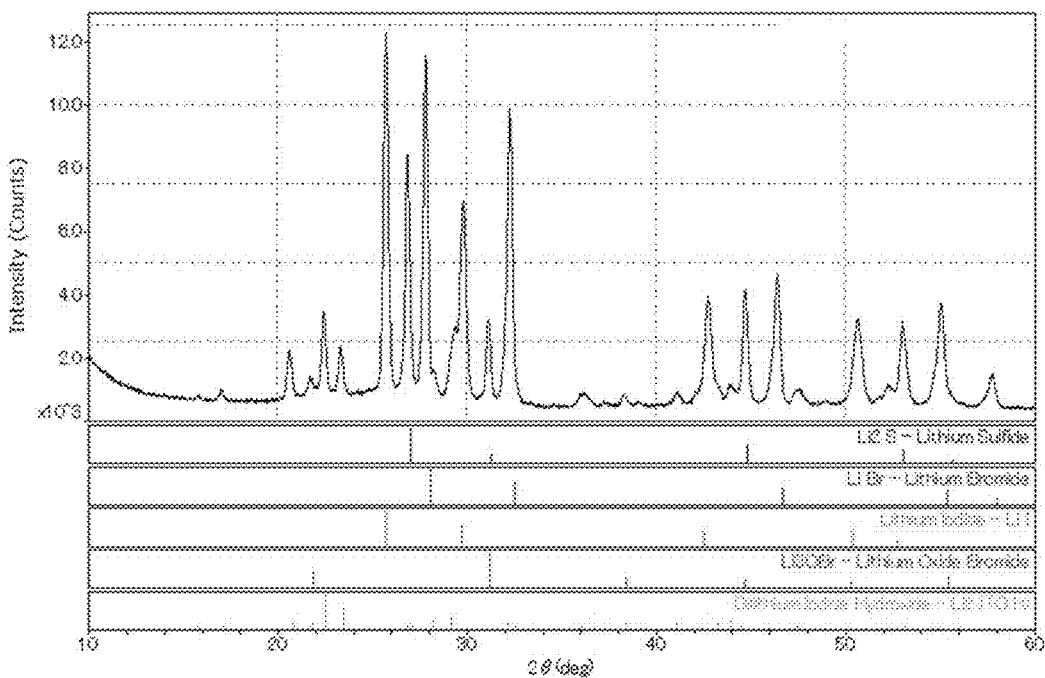
FIG. 6 is an X-ray diffraction spectrum of the powder obtained in Comparative Example 1.
Figure 7:
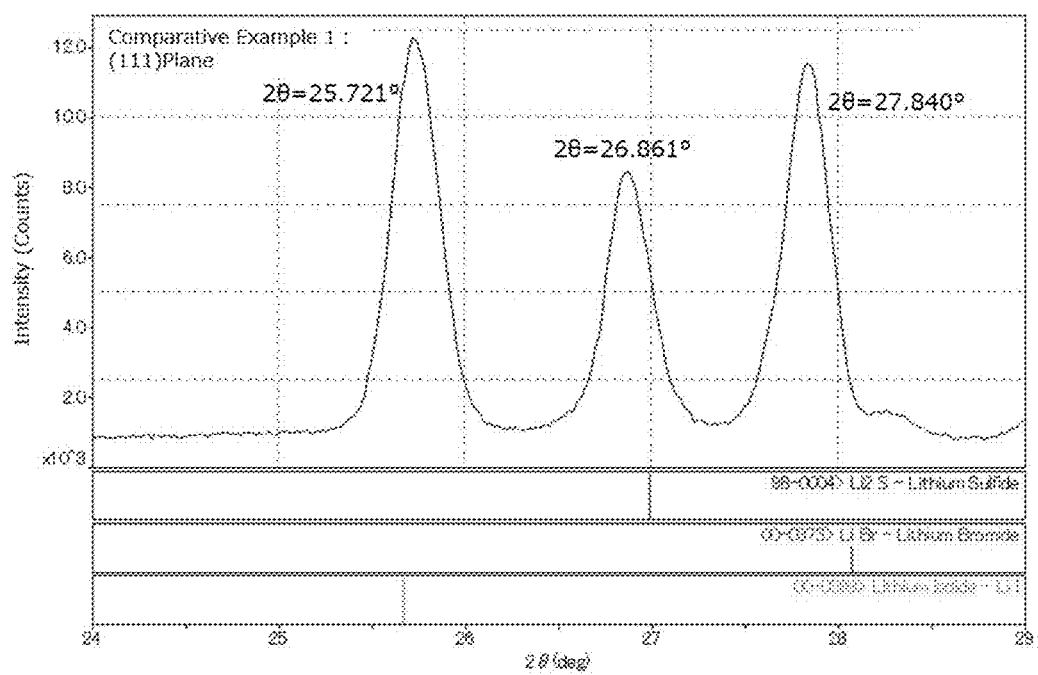
FIG. 7 is an enlarged illustration of the X-ray diffraction spectrum at (111) plane of the powder obtained in Comparative Example 1.

Subsequently, hydrogen sulfide was switched to nitrogen gas, cooled to room temperature, and the powder in the separable flask was recovered. The content of lithium sulfide, lithium hydroxide and lithium carbonate in the resultant powder was measured. The content is shown in Table 1. The resultant powder was analyzed through powdery X-ray diffractometry (XRD) using an X-ray diffractometer (XRD) (SmartLab Device, manufactured by Rigaku Corporation). The X-ray diffraction spectrum is shown in FIG. 6. An enlarged view at (111) plane is shown in FIG. 7. At (111) plane, the diffraction angle of the peak of the simple substance of lithium sulfide, lithium bromide and lithium iodide, the diffraction angle of the peak thereof in the sulfur-containing complex and the shift width are shown in Table 2.

Comparative Example 2

In a separable flask (made with SUS, 500 mL) equipped with an anchor blade, 15.15 g (0.633 mol) of anhydrous lithium hydroxide (manufactured by Honjo Chemical Corporation, water content: 1% by mass or less) and 150 mL of ion-exchanged water were put, and stirred at room temperature to give an aqueous lithium hydroxide solution. Hydrogen sulfide (manufactured by Sumitomo Seika Chemicals Co., Ltd.) was supplied to the aqueous lithium hydroxide solution at 200 N-mL/min for 2 hours with bubbling to give an aqueous lithium hydrosulfide solution. Apart from this, 7.53 g (0.0563 mol) of lithium iodide and 7.32 g (0.0843 mol) of lithium bromide (both by Honjo Chemical Corporation) were dissolved in 120 mL of ion-exchanged water to prepare a lithium halide solution, and put into the above-mentioned separable flask to be mixed with the lithium hydrosulfide solution therein, thereby producing an aqueous solution containing lithium hydrosulfide and lithium halide (lithium iodide and lithium bromide).

The separable flask with the aqueous solution containing lithium hydrosulfide, lithium iodide and lithium bromide therein was set in an oil bath at 130° C. and heated at 130° C. therein, and then nitrogen was fed into the vapor phase in the separable flask at 200 N-mL/min for 8 hours. The formed water was evaporated away and the residue was dried, further heated up to 250° C. and kept as such for 8 hours.

Figure 8:
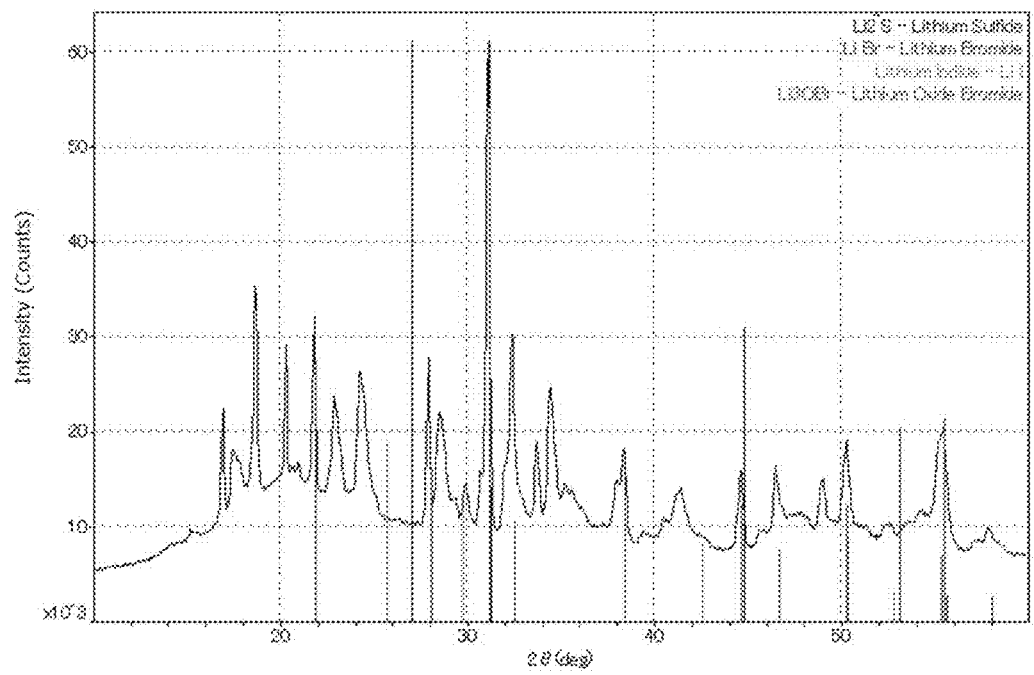
FIG. 8 is an X-ray diffraction spectrum of the powder obtained in Comparative Example 2.

Subsequently, this was cooled to room temperature, and the powder in the separable flask was recovered. The resultant powder was analyzed through powdery X-ray diffractometry (XRD) using an X-ray diffractometer (XRD) (SmartLab Device, manufactured by Rigaku Corporation). The X-ray diffraction spectrum is shown in FIG. 8. In the powder obtained in Comparative Example 2, the diffraction angle of the peak of lithium sulfide, lithium bromide and lithium iodide in the sulfur-containing complex at (111) plane could not be read out.

TABLE 1

|  | Example 1 | | Comparative Example 1 | |
|---|---|---|---|---|
|  | Content (mass %) | Conversion (mass %) | Content (mass %) | Conversion (mass %) |
| $Li_2S$ | 49.3 | 99.6 | 27.2 | 49.0 |
| LiOH | 0.1 | 0.2 | 3.5 | 0.2 |
| $Li_2CO_3$ | 0.3 | 0.3 | 1.3 | 0.3 |

Note)
Conversion means the conversion relative to the charge-in amount of lithium hydroxide.

The results in Table 1 confirm that, according to the production method of Example 1, almost all the charge-in amount of lithium hydroxide converted into lithium sulfide, but in the production method of Comparative Example 1 where hydrogen sulfide was supplied after heating in the co-presence of lithium hydroxide and lithium halide, only a half or less of the charge-in amount of lithium hydroxide converted into lithium sulfide. The results in Comparative Example 2 confirm that in the case of heating in the co-presence of lithium hydrosulfide and lithium halide with no supply of hydrogen sulfide, lithium sulfide was not almost produced. In that manner, it is confirmed that, according to the production method of a sulfur-containing complex of the present embodiment, a sulfur-containing complex having a high purity can be obtained at a higher efficiency.

TABLE 2

|  |  |  | Diffraction Angle of Peak (2θ) | | Difference in Diffraction Angle from $Li_2S$ | | | |
|---|---|---|---|---|---|---|---|---|
|  |  |  | Simple Substance | Complex | Simple Substance (A) | Complex (B) | (A) − (B) | Shift Width |
| Example 1 | (111) Plane | LiI | 25.643 | 25.874 | 1.319 | 1.101 | 0.218 | 0.231 |
|  |  | $Li_2S$ | 26.962 | 26.975 | — | — | — | 0.013 |
|  |  | LiBr | 28.046 | 27.727 | 1.084 | 0.752 | 0.332 | 0.319 |

TABLE 2-continued

| | | | Diffraction Angle of Peak (2θ) | | Difference in Diffraction Angle from Li₂S | | | |
|---|---|---|---|---|---|---|---|---|
| | | | Simple Substance | Complex | Simple Substance (A) | Complex (B) | (A) − (B) | Shift Width |
| | (200) Plane | LiI | 29.695 | 30.029 | 1.537 | 1.217 | 0.32 | 0.334 |
| | | Li₂S | 31.232 | 31.246 | — | — | — | 0.014 |
| | | LiBr | 32.496 | 32.136 | 1.264 | 0.89 | 0.374 | 0.36 |
| | (220) Plane | LiI | 42.494 | 42.91 | 2.259 | 1.899 | 0.36 | 0.416 |
| | | Li₂S | 44.753 | 44.809 | — | — | — | 0.056 |
| | | LiBr | 46.618 | 46.113 | 1.865 | 1.304 | 0.561 | 0.505 |
| | (311) Plane | LiI | 50.294 | 50.922 | 2.731 | 2.162 | 0.569 | 0.628 |
| | | Li₂S | 53.025 | 53.084 | — | — | — | 0.059 |
| | | LiBr | 55.29 | 54.679 | 2.265 | 1.595 | 0.67 | 0.611 |
| Comparative Example 1 | (111) Plane | LiI | 25.643 | 25.721 | 1.319 | 1.14 | 0.179 | 0.078 |
| | | Li₂S | 26.962 | 26.861 | — | — | — | 0.101 |
| | | LiBr | 28.046 | 27.84 | 1.084 | 0.979 | 0.105 | 0.206 |

Note)
The numerical value in the column of "Simple Substance" of "Diffraction Angle of Peak (2θ)" is a diffraction angle of peak at each plane of lithium halide and lithium sulfide, and the numerical value in the column of "complex" is a diffraction angle of the peak of lithium halide and lithium sulfide in the complex. The numerical value in the column of "Simple Substance (A)" of "Difference in diffraction angle from Li₂S" is a difference in the diffraction angle between lithium sulfide and lithium halide as a simple substance; the numerical value in the column of "Complex (B)" is a difference in the diffraction angle between lithium sulfide and lithium halide in the sulfur-containing complex; and the numerical value in the column of "(A) − (B)" is a difference between the numerical value in the column of "Simple Substance (A)" and the numerical value in the column of "Complex (B)".

From the diffraction spectrum shown in FIG. 1, the enlarged views of FIGS. 2 to 5, and the numerical values of the diffraction angles of peaks in Table 2, it is known that, in the sulfur-containing complex obtained in Example 1, the diffraction angle of the peak of lithium halide of lithium bromide and lithium iodide shifted toward the diffraction angle of lithium sulfide not only at the (111) plane but also at (200) plane, (220) plane and (311) plane.

More specifically, the numerical value in the column of "Simple Substance (A)" of "Difference in Diffraction angle from Li₂S" is compared with the numerical value in the column of "Complex (B)" in Table 2, and the numerical value in the column of "Complex (B)" is smaller than that of the former. Namely, the difference in the diffraction angle between lithium sulfide and lithium halide in the sulfur-containing complex is smaller than the difference in the diffraction angle between lithium sulfide and lithium halide as a simple substance. From this, it is known the diffraction angle of the peak of lithium halide shifted toward the diffraction angle of the peak of lithium sulfide. For example, in the case of lithium bromide at (111) plane, the difference in the diffraction angle between lithium sulfide and lithium bromide in the sulfur-containing complex (0.752°) is smaller by 0.332° than the difference in the diffraction angle between lithium sulfide and lithium bromide as a simple substance (1.074°), and the diffraction angle of the peak of lithium bromide shifted toward the diffraction angle of the peak of lithium sulfide (toward the high angle side). Regarding lithium iodide, the difference in the diffraction angle between lithium sulfide and lithium iodide in the sulfur-containing complex (1.101°) is smaller by 0.218° than the difference in the diffraction angle between lithium sulfide and lithium iodide as a simple substance (1.319°). Thus, it is specifically confirmed that the diffraction angle of the peak of lithium iodide shifted toward the diffraction angle of the peak of lithium sulfide (toward the low angle side).

The shift width of lithium sulfide is 0.013°, the shift width of lithium bromide is 0.319°, and the shift width of lithium iodide is 0.231°. In that manner, the shift width of lithium sulfide (0.013°) is smaller than the shift width of lithium halide (lithium bromide: 0.319°, lithium iodide: 0.231°), and is more specifically smaller by 0.306° than that of lithium bromide, and by 0.218° than that of lithium iodide. In that manner, the shift width of lithium sulfide is smaller than the shift width of lithium halide, and it is considered that in the sulfur-containing complex of the present embodiment, the diffraction angle of lithium halide shifted toward the diffraction angle of lithium sulfide.

On the other hand, in the powder of Comparative Example 1, the shift width of lithium sulfide is 0.101°, while the shift width of lithium bromide is 0.206° and is larger than the shift width of lithium sulfide; however, the shift width of lithium iodide is 0.078° and is smaller than the shift width of lithium sulfide (see Table 2 and FIG. 7). It is known that the powder of Comparative Example 1 shows a behavior different from that of the sulfur-containing complex of the present embodiment.

In the diffraction spectrum shown in FIG. 1, peaks of oxygen-containing lithium halide compounds and lithium halide hydrates are not seen, from which it is confirmed that the sulfur-containing complex obtained in Example 1 did not contain these impurities. In addition, the diffraction spectra shown in FIGS. 1 to 5 confirm that the peak intensity of lithium sulfide at the (111) plane is higher than the peak intensity of lithium halide at that plane. The same tendency also appeared in the other (200) plane, (220) plane and (311) plane.

On the other hand, in the diffraction spectrum shown in FIG. 6, other peaks than those of a sulfur-containing complex are seen. These peaks are peaks of oxygen-containing lithium halide, and it is confirmed that the powder obtained in Comparative Example 1 contains oxygen-containing lithium halide. In addition, from the diffraction spectra in FIGS. 6 and 7, it is confirmed that the peak intensity of lithium sulfide at the (111) plane is weaker than the peak strength of lithium halide. In that manner, it is confirmed that the powder obtained in Comparative Example 1 shows a behavior quite different from that of the sulfur-containing complex of the present embodiment of Example 1.

It is considered that the impurities in the powder obtained in Comparative Example 1 would be formed by side reaction that would have occurred by heating in the co-existence of lithium hydroxide and lithium halide. In addition, it is also considered that, in the powder obtained in Comparative Example 1, the conversion to lithium sulfide would have lowered since lithium hydroxide was consumed for the side reaction to form impurities.

In the diffraction spectrum shown in FIG. 8, peaks of a sulfide complex as in FIG. 1 are not confirmed but peaks of oxygen-containing lithium halide are confirmed, from which it is known that the powder obtained in Comparative Example 2 is not a sulfur-containing complex but is a mixture of lithium hydroxide and impurities such as oxygen-containing lithium halide or lithium halide hydrate.

Example 2: Production of Sulfide Solid Electrolyte 53 g (5 mmφ) of zirconia balls, 1.116 g of the sulfur-containing complex obtained in Example 1, and 0.877 g of diphosphorus pentasulfide were put into a 45-mL zirconia pot, and the pot was set in a planetary mill ("LP-5 (model number)", manufactured by Ito Seisakusho Co., Ltd.), and subjected to dry reaction at a table rotation speed of 300 rpm for 24 hours.

Comparative Example 3

53 g (5 mmφ) of zirconia balls, 0.556 g of lithium sulfide, 0.277 g of lithium iodide, 0.285 g of lithium bromide and 0.877 g of diphosphorus pentasulfide were put in a 45-mL zirconia pot, and the pot was set in a planetary mill ("LP-5 (model number)", manufactured by Ito Seisakusho Co., Ltd.), and subjected to dry reaction at a table rotation speed of 300 rpm for 24 hours.

The product obtained in Example 2 was analyzed through powdery X-ray diffractometry (XRD) using an X-ray Diffractometer (XRD) (SmartLab Device, manufactured by Rigaku Corporation). In this, diffraction peaks derived from lithium sulfide, lithium iodide and lithium bromide were not detected, and the product was confirmed to be an amorphous solid electrolyte. On the other hand, the product obtained in Comparative Example 3 was also analyzed through XRD in the same manner. In this, diffraction peaks derived from lithium sulfide, lithium iodide and lithium bromide were detected, which confirm that a part of the raw materials remained in the product.

From the results of Example 2 and Comparative Example 3, it can be said that, when the sulfur-containing complex obtained according to the production method of the present embodiment (this may also be said to be the sulfur-containing complex of the present embodiment) is used, a sulfide solid electrolyte can be obtained more efficiently since the reactivity of the complex with diphosphorus pentasulfide is high.

INDUSTRIAL APPLICABILITY

The sulfur-containing complex obtained according to the production method for a sulfur-containing complex of the present embodiment (and the sulfur-containing complex of the present embodiment) has a structure of lithium sulfide and lithium halide bonding to each other on a molecular level, and therefore the reactivity thereof to other raw materials such as diphosphorus pentasulfide to be used as the raw materials for sulfide solid electrolytes. In addition, the complex does not contain impurities such as lithium hydroxide and $Li_3OX$ (where X represents a halogen atom) of lithium elements, oxygen element and halogen element bonding to each other. Consequently, the sulfur-containing complex is favorably used as a raw material for sulfide solid electrolytes.

The sulfide solid electrolyte to be obtained is favorably used in lithium ion secondary batteries, etc., more specifically for a solid electrolyte layer of an all-solid lithium ion secondary battery, or for a solid electrolyte to be mixed in a positive electrode or negative electrode mixture. For example, placing a layer of a solid electrolyte between a positive electrode and a negative electrode provides an all-solid lithium ion secondary battery.

The invention claimed is:

1. A method for producing a sulfur-containing complex, comprising:
    obtaining a lithium hydrosulfide solution by supplying hydrogen sulfide to a lithium hydroxide solution, wherein the lithium hydroxide solution substantially contains no lithium halide;
    mixing the lithium hydrosulfide solution and a lithium halide to provide a mixture comprising lithium hydrosulfide, lithium halide and a solvent;
    obtaining a powder by evaporating the solvent from the mixture by supplying hydrogen sulfide to the mixture while heating the mixture; and
    heating the powder while supplying hydrogen sulfide.

2. The method for producing a sulfur-containing complex according to claim 1, further comprising mixing a lithium hydrosulfide solution and a lithium halide solution to give the solution containing a lithium hydrosulfide and a lithium halide which is heated for supplying the hydrogen sulfide.

3. The method for producing a sulfur-containing complex according to claim 1, further comprising heating a solution containing a lithium hydroxide and a lithium halide under a temperature condition of 0° C. or higher and 100° C. or lower in the presence of hydrogen sulfide to give the solution containing a lithium hydrosulfide and a lithium halide which is heated for supplying the hydrogen sulfide.

4. The method for producing a sulfur-containing complex according to claim 1, wherein in heating the mixture containing a lithium hydrosulfide and a lithium halide in the presence of hydrogen sulfide, the hydrogen sulfide is supplied at a flow rate of 0.01 N-L/min or more and 20 N-L/min or less relative to 1 kg of the solid content in the mixture.

5. The method for producing a sulfur-containing complex according to claim 1, wherein in heating the mixture containing a lithium hydrosulfide and a lithium halide in the presence of hydrogen sulfide, the heating is carried out at 100° C. or higher and 400° C. or lower.

6. The method for producing a sulfur-containing complex according to claim 1, wherein the lithium halide is at least one selected from lithium chloride, lithium bromide and lithium iodide.

7. The method for producing a sulfur-containing complex according to claim 3, wherein in obtaining the mixture containing a lithium hydrosulfide and a lithium halide, hydrogen sulfide is supplied at a flow rate of 0.01 N-L/min or more and 20 N-L/min or less relative to 1 kg of the solid content in the mixture.

8. The method for producing a sulfur-containing complex according to claim 1, further comprising reacting the resulting sulfur-containing complex and a phosphorus compound to obtain a sulfide solid electrolyte.

9. The method for producing a sulfur-containing complex according to claim 1, wherein the sulfur-containing complex comprises a lithium sulfide and a lithium halide, exhibiting, in X-ray diffractometry using a CuKα ray, a diffraction angle of the peak of lithium halide shifting toward the diffraction angle of the peak of lithium sulfide, and not comprising an oxygen-containing lithium halide represented by $Li_3OX$, where X represents a halogen element.

* * * * *